(12) United States Patent
Gribel

(10) Patent No.: US 9,886,289 B2
(45) Date of Patent: *Feb. 6, 2018

(54) SYSTEM AND METHOD FOR INJECTING RUN-TIME PROGRAMMING CODE IN A PRINTING DEVICE

(75) Inventor: Staffan Gribel, Gothenburg (SE)

(73) Assignee: SATO HOLDINGS KABUSHIKI KAISHA (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/381,359

(22) PCT Filed: Jun. 8, 2009

(86) PCT No.: PCT/JP2009/060812
§ 371 (c)(1),
(2), (4) Date: Feb. 16, 2012

(87) PCT Pub. No.: WO2010/143308
PCT Pub. Date: Dec. 16, 2010

(65) Prior Publication Data
US 2012/0137314 A1    May 31, 2012

(51) Int. Cl.
*G06F 9/44* (2006.01)
*G06F 9/445* (2006.01)

(52) U.S. Cl.
CPC .............. *G06F 9/445* (2013.01); *G06F 8/67* (2013.01)

(58) Field of Classification Search
CPC ....................................................... G06F 9/44
USPC .................................. 717/148, 139, 153, 171
See application file for complete search history.

(56) References Cited

U.S. PATENT DOCUMENTS

| | | | | |
|---|---|---|---|---|
| 4,833,626 A | * | 5/1989 | Malcolm | G06K 15/10 101/93.14 |
| 5,526,469 A | * | 6/1996 | Brindle | G06K 15/00 358/1.11 |
| 5,754,748 A | | 5/1998 | Rivers et al. | |
| 5,805,777 A | * | 9/1998 | Kuchta | G06F 3/1296 358/1.13 |
| 5,812,759 A | * | 9/1998 | Brooks | 714/57 |
| 5,983,021 A | * | 11/1999 | Mitrovic | 717/158 |
| 6,057,858 A | * | 5/2000 | Desrosiers | G06K 15/02 345/467 |

(Continued)

FOREIGN PATENT DOCUMENTS

| | | |
|---|---|---|
| CN | 1234553 A | 11/1999 |
| EP | 0 945 791 A2 | 9/1999 |

(Continued)

OTHER PUBLICATIONS

International Search Report dated Sep. 15, 2009 in corresponding International Application No. PCT/JP2009/060812.

(Continued)

*Primary Examiner* — Jae Jeon
(74) *Attorney, Agent, or Firm* — Ostrolenk Faber LLP

(57) ABSTRACT

A method and system for modifying functionality of a printer. The printer is provided with firmware and programming code that interfaces with the firmware for controlling printing operations. The programming code includes at least one place holder. Second programming code is provided that, when executed on a processor readable medium, programming code is executed as a function of the at least one placeholder.

7 Claims, 10 Drawing Sheets

(56) References Cited

U.S. PATENT DOCUMENTS

| | | | |
|---|---|---|---|
| 6,146,030 A * | 11/2000 | Ackley | G06K 19/06028 400/103 |
| 6,260,157 B1 * | 7/2001 | Schurecht et al. | 714/6.13 |
| 6,512,595 B1 * | 1/2003 | Toda | G06K 15/02 358/1.1 |
| 6,525,835 B1 * | 2/2003 | Gulati | G07B 17/00508 235/462.01 |
| 6,847,466 B1 * | 1/2005 | Gazdik | G06F 3/1205 358/1.13 |
| 7,472,910 B1 * | 1/2009 | Okada | B41J 3/4075 358/1.15 |
| 7,979,260 B1 * | 7/2011 | Sobel | G06F 9/4416 703/13 |
| 8,359,405 B1 * | 1/2013 | Border | H04L 47/10 709/246 |
| 2002/0099866 A1 * | 7/2002 | Vlissides | 709/315 |
| 2002/0180791 A1 * | 12/2002 | Broussard | G06F 9/4443 715/763 |
| 2002/0186393 A1 * | 12/2002 | Pochuev | G06F 3/1292 358/1.13 |
| 2003/0011592 A1 * | 1/2003 | Southwell | G06T 15/005 345/420 |
| 2003/0020948 A1 * | 1/2003 | Jarvis et al. | 358/1.15 |
| 2003/0182142 A1 * | 9/2003 | Valenzuela et al. | 705/1 |
| 2004/0008361 A1 * | 1/2004 | Johnson | G06K 15/02 358/1.13 |
| 2004/0107416 A1 * | 6/2004 | Buban et al. | 717/170 |
| 2004/0120001 A1 * | 6/2004 | Boldon | G06F 8/66 358/1.15 |
| 2004/0207859 A1 * | 10/2004 | Kadoi et al. | 358/1.1 |
| 2005/0062762 A1 * | 3/2005 | Wang | G06T 15/00 345/643 |
| 2005/0137937 A1 * | 6/2005 | Njo | G06Q 10/08 705/26.1 |
| 2005/0141007 A1 * | 6/2005 | Shirai | G06F 3/0486 358/1.13 |
| 2005/0185058 A1 * | 8/2005 | Sablak | H04N 5/23248 348/208.99 |
| 2005/0185211 A1 * | 8/2005 | Foehr et al. | 358/1.15 |
| 2005/0237556 A1 * | 10/2005 | Watkins | 358/1.13 |
| 2006/0058103 A1 * | 3/2006 | Danieli et al. | 463/42 |
| 2006/0061827 A1 * | 3/2006 | Moss | G06T 1/60 358/3.27 |
| 2006/0103869 A1 * | 5/2006 | Kato | 358/1.13 |
| 2006/0106629 A1 * | 5/2006 | Cohen | G06Q 10/10 705/39 |
| 2006/0109240 A1 * | 5/2006 | Fu | G06F 3/14 345/156 |
| 2006/0215199 A1 * | 9/2006 | Morita | G06F 3/1207 358/1.13 |
| 2007/0046820 A1 * | 3/2007 | Mead et al. | 348/571 |
| 2007/0083713 A1 * | 4/2007 | Torrini et al. | 711/125 |
| 2008/0162447 A1 * | 7/2008 | Ritter et al. | 707/5 |
| 2008/0266579 A1 * | 10/2008 | Suzuki | G06F 17/212 358/1.1 |
| 2009/0063718 A1 * | 3/2009 | Sekine | G06F 9/4411 710/8 |
| 2009/0161153 A1 * | 6/2009 | Sakai | G03G 21/02 358/1.15 |
| 2009/0216865 A1 * | 8/2009 | Sakai | G06F 3/1203 709/221 |
| 2010/0232759 A1 * | 9/2010 | Suga | H04N 5/76 386/200 |
| 2010/0306651 A1 * | 12/2010 | Quennesson et al. | 715/704 |
| 2011/0145803 A1 * | 6/2011 | Soderstedt | 717/154 |
| 2011/0209137 A1 | 8/2011 | Berg et al. | 717/171 |
| 2013/0113833 A1 * | 5/2013 | Larsson | H04L 67/08 345/642 |

FOREIGN PATENT DOCUMENTS

| | | |
|---|---|---|
| JP | 10-143334 | 5/1998 |
| JP | 2003-526845 | 9/2003 |
| JP | 2006-85291 | 3/2006 |
| WO | WO 00/49495 | 8/2000 |
| WO | WO 01/30581 | 5/2001 |

OTHER PUBLICATIONS

Search Report dated Oct. 4, 2012 issued in corresponding European Patent Application No. 09845833.4.

M. Franz, "Dynamic Linking of Software Components", Computer, IEEE Service Center, Los Alamitos, CA, US, vol. 30, No. 3, XP000657328 (1997) pp. 74-81.

Written Opinion issued in corresponding Singapore Patent Application No. 201109044-6 dated Aug. 10, 2012 (10 pages).

"A Guide to Smart Printing Understanding the Capabilities, Use Cases and Advantages of Smart Printers," 6 pages, Intermec Technologies Corporation, 2009.

Search Report dated Nov. 18, 2013 in counterpart Chinese Application No. 2009801597680, along with an English translation thereof.

First Office Action dated Nov. 26, 2013 in counterpart Chinese Application No. 2009801597680, along with an English translation of relevant portions thereof.

English language translation of a Notice of Reasons for Rejection dated Jul. 9, 2013 in counterpart-Japanese Patent Application No. JP2011-551352.

\* cited by examiner

SYSTEM AND METHOD FOR INJECTING RUN-TIME PROGRAMMING CODE IN A PRINTING DEVICE

CROSS REFERENCE TO RELATED APPLICATIONS

The present application is a 35 U.S.C. §371 National Phase conversion of PCT/JP2009/060812, filed Jun. 8, 2009, the entire contents of which is incorporated herein by reference. The PCT International Application was published in the English language.

BACKGROUND

Field of the Invention

The present invention relates generally to printers and, more particularly, to enhancing printer functionality with programming code.

Description of the Related Art

Most label and tag printers operate via a conventional predefined proprietary control language. For example, SATO Barcode Printer Language ("SBPL"), ZEBRA programming language ("ZPL"), DATAMAX Printer Language ("DPL"), INTERMEC Printer Language ("IPL") or the like all include proprietary functionality that requires a fairly significant minimum skill level in order to enable a user to effect changes in the printers' output functionality. Various printer models, such as provided by vendors of printers supporting the printer languages listed above, can perform printing tasks defined by the predefined individual commands. Specific changes to a printer's functionality are typically made by changing the firmware of the printer.

Since each printer's respective control language is predefined, existing printers can only perform predefined tasks. In case various printer functions need to be added, the printer's firmware needs to be changed. This often involves making complex source code revisions and embedded programming development tools to make the revisions. This is not a flexible approach and customization cannot be done locally by the end-user of the printer.

Further, although printer functionality may be built into a program at design time, different types of data files or settings can enable existing programmed functionality, but cannot add new functionality. Moreover, programmed applications can only be designed for a limited number of situations. When new functionality is added, the whole program must be replaced and the printer restarted. This is time-consuming and, accordingly, expensive.

SUMMARY

In the prior art, there is no ability to customize or otherwise modify label/tag printer software without changing the printer's firmware source code, and without expensive development tools.

Accordingly, a method and system is provided for modifying functionality of a printer. The printer is provided with firmware and programming code that interfaces with the firmware for controlling printing operations. The programming code includes at least one placeholder. Second programming code is provided that, when executed on a processor readable medium, interfaces with the first programming code to provides new or different printer functionality. The second programming code is executed as a function of the at least one placeholder.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DESCRIPTION OF EMBODIMENTS

Figure 1:
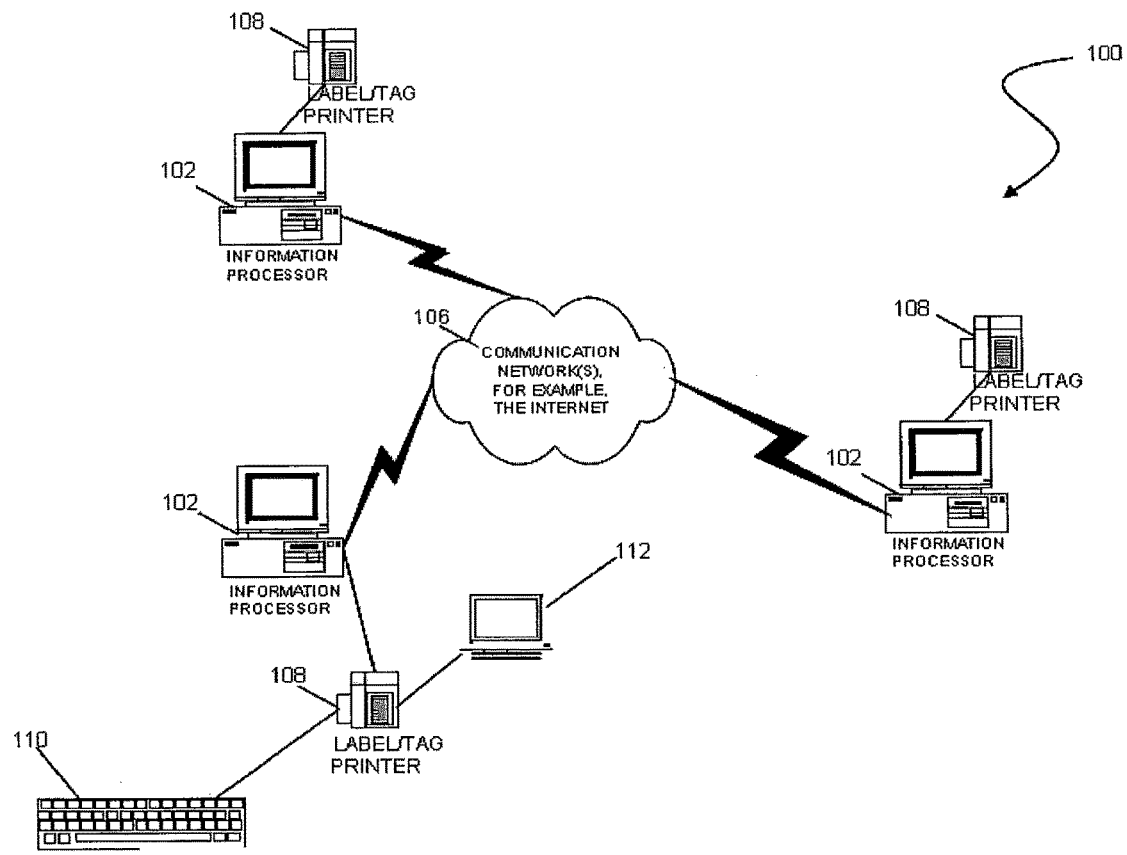
FIG. 1 illustrates an example hardware arrangement, in accordance with a preferred embodiment.

In accordance with the teachings herein, one or more interfaces are provided enabling individuals to customize label and tag printer settings without a need to update, change or otherwise alter firmware source code provided with the label and tag printer, and without a need for expensive development tools. Thus, a label and tag printer is effectively enabled for application development without a need for having others to write applications using the printer's proprietary interpreted language, which developed the printer's firmware.

In a preferred embodiment, an interpreted script language is provided in combination with a label and tag printer. A set of printer extensions formatted as printer application programming interfaces ("APIs") are provided to enable interaction and manipulation with printer firmware for custom and extended functionality. The APIs are preferably provided for label and tag printers. In a preferred embodiment, the interpreted scripting language is LUA.

By interfacing the printer firmware with the set of printer APIs, for example, developed in the scripting language, users of label and tag printers are afforded improved flexibility and accessibility via software commands used by the label and tag printer to perform various tasks. Using APIs in combination with the printer's firmware, users can develop custom printing functionality and are no longer required to change a label and tag printer's firmware source code or access to development tools typically required for changing or modifying the label and tag printer's firmware source code. As described in greater detail below, the APIs provided in connection with the teachings herein support various functionalities, such as interfacing different keyboards, displays, providing variable fonts and formats of print rendering, accessing printer file systems, printer configurations and various other functions related to label and tag printing.

Thus, the present invention provides a plurality of printing solutions without a need for firmware source code modifications or expensive embedded systems including, for example, software development tools for modifying predefined proprietary control and printer firmware.

Moreover, features are provided herein that enable users to develop programming code for printer functionality, including custom functions, and to deploy the code to the printer to provide the printer with the functionality via APIs. Thereafter, in accordance with the teachings herein, users develop additional programming code to be integrated in the previously deployed programming code without a need to redeploy the previously deployed programming code. In this way, code can be developed for enhanced printer functionality and then deployed, for example, to a label and tag printer. Thereafter, the user develops additional code, including programming code that is executed at run-time, for one or other printer functions, or to modify a function of the previously deployed code. In accordance with the teachings herein, the user need only deploy the additional code to the printer while the previously deployed code remains with the printer. A tremendous amount of time is saved by enabling users to develop and deploy only that code that provides new or modified functionality, Thus, users need only create necessary programs that comprise additional functionality and then provide that code with the printer. In a preferred embodiment, the code is downloaded into a flash (or other known) memory, and thereafter received by the printer. A previously deployed program preferably integrates the newly deployed programming code, as described in greater detail below, and operates as a single, unified program.

The ability to inject runtime programming code into a printer, such as a label and tag printer, solves shortcomings in the prior art, including by enabling the deployment of improvements and new printer functionality to a printer without having to re-deploy previously deployed code to the printer. In this way, previously deployed custom programming that interfaces with a printer's firmware can be modified or otherwise updated more simply and more quickly. Users need only develop the particular programming code for additional functionality and deploy it to the printer, such as by downloading the code to a flash memory which then interfaces with the printer's firmware.

In a preferred embodiment, previously deployed programming code that is developed for customized functionality includes placeholders, as known in the art, for later deployed programming code that integrate the later deployed code into the previously deployed code. Preferably, the previously deployed programming code loads newly deployed code and implements new functionality at runtime without a need to redeploy or restart the printer device. In this way, newly added programmed instructions are executed at runtime. In one embodiment, the newly deployed program code is developed or written in the same programming language as the previously deployed programming code. In an alternative embodiment, the newly deployed program code is developed in a different programming language than the previously deployed code. In either case, the functionality provided the newly deployed programming code becomes a fully integrated part of the printer's running software, including the previously deployed code, and is accessible as such.

In a preferred embodiment, customized programming code to be deployed to a printer having previously deployed customized code, is developed as a script program, and is tokenized by the interpreter, and loaded to SDRAM memory before it is started. When a previously deployed custom programming code runs, instructions are preferably executed that perform an inventory to see whether any newly deployed or injected programs can be added to the tokenized program. The tokenized runtime (in SDRAM) then contains both original and new injected programs. Since the original or previously deployed program is not aware of any particular program that is added, the previously deployed program includes placeholders that provide accessibility to the added programs. Accordingly, customized programming applications that are loaded by the printer's firmware API preferably include placeholders for newly deployed or injected programs to be integrated therewith. The newly deployed programs preferably operate as a fully integrated part of the original program.

In a preferred embodiment, customized programming code can be developed in any of a plurality of generic platforms, including spreadsheets, databases, text editors, word processors, integrated development environments, or the like, and new custom printer functionality can be added by users, as desired. By enabling end users to develop custom applications that are integrated with previously deployed applications, the teachings herein provide a powerful way to enhance printer functionality since the complete programming provided by a printer's firmware and any previously deployed applications providing customized functionality are integrated with newly developed programming code.

In accordance with an embodiment, new or modified functionality of a printer via customized programming code is not effected via the printer's firmware. Instead, programming instructions, including those provided in a script, are "injected" into existing customized programming code as a function of placeholders. Such a high level code injection technique enables end users to easily and quickly modify and improve printer functionality without a need to change a printer's firmware or redeploy a customized program application that is updated with the modified or improved printer functionality.

Referring now to the drawing figures, in which like reference numerals represent like elements, FIG. 1 illustrates an exemplary hardware arrangement, in accordance with an embodiment of the present invention, for providing and installing printer application programs either via a direct cable connection or over a communication network, and referred herein, generally, as system 100. In the example shown in FIG. 1, information processor(s) 102 are provided with an integrated development programming environment ("IDE"), such as to develop applications in the LUA programming language, as known to those skilled in the art. Information processor 102 preferably includes all databases necessary to support the present invention. However, it is contemplated that information processor 102 can access any required database via communication network 106 or any other communication network to which information processor 102 may be coupled. Communication network 106 is preferably a global public communication network such as the Internet, but can also be a wide area network (WAN), local area network (LAN), an intranet or other network that enables computing devices and peripheral devices to communicate.

In a preferred embodiment, information processor 102 is any computer readable medium device that is capable of sending and receiving data across communication network 106, e.g., mainframe computers, mini computers, personal computers, laptop computers, personal digital assistants (PDA), cellular telephones and Internet access devices such as Web TV. In addition, information processors 102 are preferably equipped with web browser software, such as MICROSOFT INTERNET EXPLORER, MOZILLA FIREFOX, or the like. Information processors 102 are coupled to communication network 106 using any known data communication networking technology.

Also shown in FIG. 1 is printer 108 that is preferably a label and tag printer and operable to print labels and tags of data received from information processors 102. Label and tag printer 108 may be provided with keyboard 110 and display 112 to enable input and output functionality with label and tag printer 108 in the absence of or in conjunction with information processor 102.

Figure 2:
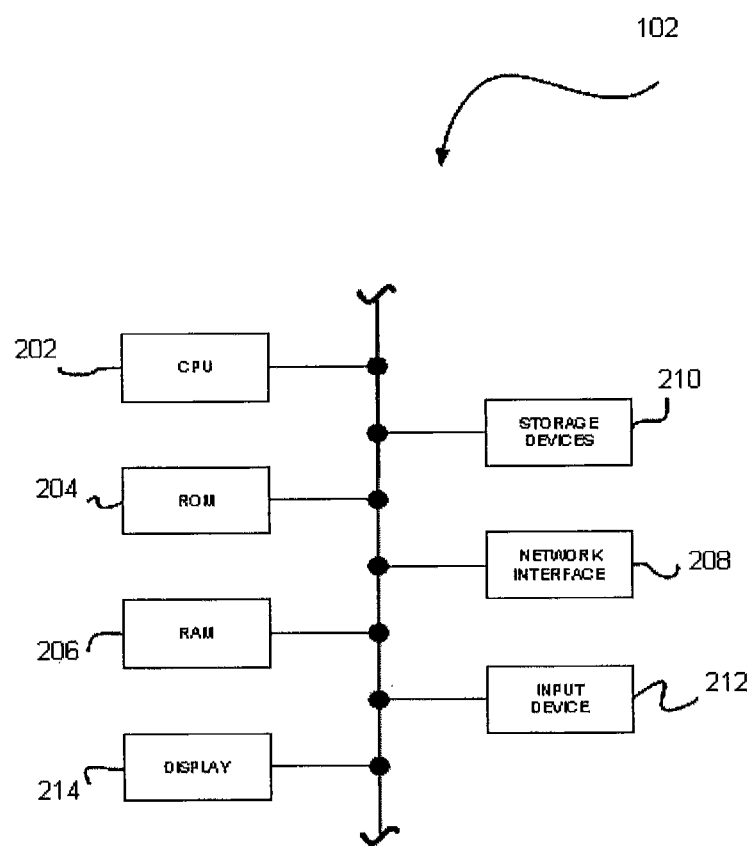
FIG. 2 illustrates the functional elements of an example information processor shown in FIG. 1.

FIG. 2 illustrates the functional elements of an exemplary information processor 102, and includes one or more central processing units (CPU) 202 used to execute software code and control the operation of information processor 102. Other elements include read-only memory (ROM) 204, random access memory (RAM) 206, one or more network interfaces 208 to transmit and receive data to and from other computing devices across a communication network, storage devices 210 such as a hard disk drive, floppy disk drive, tape drive, CD ROM or DVD for storing program code databases and application data, one or more input devices 212 such as a keyboard, mouse, track ball, microphone and the like, and a display 214. Further, one or more of functional elements 202-214 may be suitably configured or provided with label and tag printer 108, as well.

The various components of information processor 102 need not be physically contained within the same chassis or even located in a single location. For example, storage device 210 may be located at a site which is remote from the remaining elements of information processor 102, and may even be connected to CPU 202 across communication network 106 via network interface 208. Information processor 102 preferably includes a memory equipped with sufficient storage to provide the necessary databases, forums, and other community services as well as acting as a web server for communicating hypertext markup language (HTML), Java applets, and Active-X control programs. Information processors 102 are arranged with components, for example, those shown in FIG. 2, suitable for the expected operating environment of information processor 102. The CPU(s) 202, network interface(s) 208 and memory and storage devices are selected to ensure that capacities are arranged to accommodate expected demand.

The nature of the invention is such that one skilled in the art of writing computer executable code (i.e., software) can implement the functions described herein using one or more of a combination of popular computer programming languages and developing environments including, but not limited to, LUA, C, C++, Visual Basic, JAVA, HTML, XML, ACTIVE SERVER PAGES, JAVA server pages, servlets, MYSQL and PHP.

Although the present invention is described by way of example herein and in terms of a web-based system using web browsers and a web site server (e.g., information processor 102), system 100 is not limited to such a configuration. It is contemplated that system 100 is arranged such that label and tag printer 108 communicates with and outputs data received from information processor 102 using any known communication method, for example, using a non-Internet browser WINDOWS viewer coupled with a local area network protocol such as the Internet Packet Exchange (IPX), dial-up, third-party, private network or a value added network (VAN).

It is further contemplated that any suitable operating system can be used on information processor 102, for example, DOS, WINDOWS 3.x, WINDOWS 95, WINDOWS 98, WINDOWS NT, WINDOWS 2000, WINDOWS ME, WINDOWS CE, WINDOWS POCKET PC, WINDOWS XP, MAC OS, UNIX, LINUX, PALM OS, POCKET PC and any other suitable operating system.

In a preferred embodiment, label and tag printer 108 applications are developed in the LUA programming language. In accordance with a preferred embodiment, a LUA interpreter is included that is operable to process LUA programming statements provided in the applications. Unlike typical high-level programming languages, LUA is a scripting language and not a basic programming language. Unlike typical label and tag printers that receive SBPL commands or other predefined commands to cause the label and tag printer to execute various functionalities, the present invention implements printer APIs that are extensions to the LUA language that interface with the printer firmware and that are interpreted by the LUA interpreter. This enables more advanced and complex applications to be developed such as via function calls. Furthermore, by implementing APIs that are extensions to the LUA programming language, a portion of label and tag printer 108 functionality can be modified, as opposed to prior art label and tag printers that require a complete overwrite of their respective firmware applications in order to implement a single change.

Another benefit of the present invention is that applications developed in the LUA programming language and implemented in label and tag printer 108 APIs are more compact and execute significantly faster. This is because prior art label and tag printers require more software instructions in order to implement various functions that otherwise are accomplished by APIs of the present invention. Further, the LUA interpreter interfaces with the APIs of the present invention efficiently, such as by taking advantage of function calls, variable declarations or the like, and code utilization is significantly improved over prior art label and tag printers, as a function of fewer memory requirements.

Another advantage of the LUA printer APIs of the present invention over prior art label and tag printers is an ability to access print functions without requiring an interpreter to access the print functions via an existing control language, such as SBPL or ZPL. In other words, the APIs directly interface with the label and tag printer 108 firmware that controls the printer's 108 printing functionality. This is an improvement over prior art systems that require, for example, a generation of SBPL commands to interface with an existing control language, thereby increasing steps and overhead associated with modifying printer functionality.

Moreover, since the APIs of the present invention interface via a LUA interpreter, the size limitations associated with the application are virtually eliminated with the exception of internal memory requirements based on a particular label and tag printer 108. This is an improvement over prior art label and tag printers that have, for example, limitations on the number of lines of code that can be installed and do not support dynamic memory allocation. APIs of the present invention support, for example, function calls and other high level programming language functionality, such as releasing memory ("garbage collection") that increases the amount of programming code implemented for a particular functionality.

Another benefit of the present invention is that development tools, such as MICROSOFT VISUAL STUDIO or other integrated development environments ("IDEs") are usable as a plug-in component for LUA. Application development for respective label and tag printers 108 is more attractive for developers who are familiar with or comfortable with developing software applications in visual integrated development environments.

Another benefit of the present invention is that LUA applications can be run on computers having a LUA virtual machine that simulates printer operations. The user can test developed LUA applications on computers prior to downloading and installing the applications on printers, which precludes a need to actually operate the printers to test the LUA applications.

In a preferred embodiment, a plurality of independent LUA virtual machines can be operable in a sort of chain and implemented on a single label and tag printer 108 or a network thereof. In this way, configurable dynamic local settings can be implemented, for example, for bar code printers that sort data according to various custom settings such as, for example, regional settings and language settings. The various local settings may be stored on a particular computer system's operating system, and changes to the behavior may depend upon, for example, the local settings.

By implementing APIs via a LUA interpreter, additional printer functionality can be provided beyond that previously available in the prior art. A discussion regarding additional printer functionality and improved implementations thereof afforded in accordance with a preferred embodiment is now provided.

Preferably, programming function calls and an ability to declare, address and pass values to and from programming functions via variables is supported via the LUA implementation in an example embodiment. Preferably, programming functions return a value, such as an error code, that represents whether a function executed successfully or not. In case, for example, a function does not execute as intended, an error code is returned that represents the cause of the error, the symptom of the error, the result of the error, or other suitable information. Moreover, function names and variable names, such as related to table names, string values, dates, numeric values or the like, are preferably not displayed readily to users and may be displayed, at least partially hidden or completely hidden from view.

Preferably, security implementations are supported by the teachings herein, including, for example, requiring users to have provided sufficient authorization and granted access rights to perform various tasks, such as to access particular data, one or more data directories, or to create, remove or otherwise modify data directories, data files or the like.

Another feature supported by APIs is an interface rendering. As used herein, rendering refers, generally, to creation of interactive programming objects. For example, rendered objects may be formed as data fields (e.g., text-based fields), barcodes, graphic fields. The rendered objects include one or more properties that can be manipulated, such as by methods. Preferably, objects (e.g., text field, barcode and graphic objects) rendered via APIs are provided (e.g., added or otherwise embedded) with a label object and printed via label and tag printer 108.

Moreover, APIs support providing objects, such as barcodes, positioned on a label at least partially outside of the printable region of label and tag printer 108 without causing an error while developing the label, while printing the label or both. This feature makes it possible to develop a label having, for example, a barcode in which only half of the bar code is printed by label and tag printer 108. This feature provides an improvement over prior art methods of modifying printer functionality in case a user desires a partial or otherwise incomplete object, such as a barcode, to be printed on a label via label and tag printer 108.

In one embodiment and during operation, a respective position of a rendered object, such as a text field, barcode, graphic box, image or the like, is defined by a horizontal and a vertical position parameter (e.g., "hPos" and "vPos"). The parameter values preferably define an anchor point position for an object. In case hPos and vPos are properly set, an error parameter, (e.g., "E_SUCCESS") is defined. Alternatively, if hPos or vPos is not properly set, a different error parameter (e.g., "EPARAM") is defined.

In addition to parameters defined for positioning, the present invention supports magnification of objects, such as a barcode or an image. For example, horizontal and vertical magnification parameters (e.g., "hMag" and "vMag") are defined for horizontal and vertical pixel magnification to set (e.g., from values 1-12), which represents respective degrees of horizontal and vertical magnification of an object.

Figure 3:
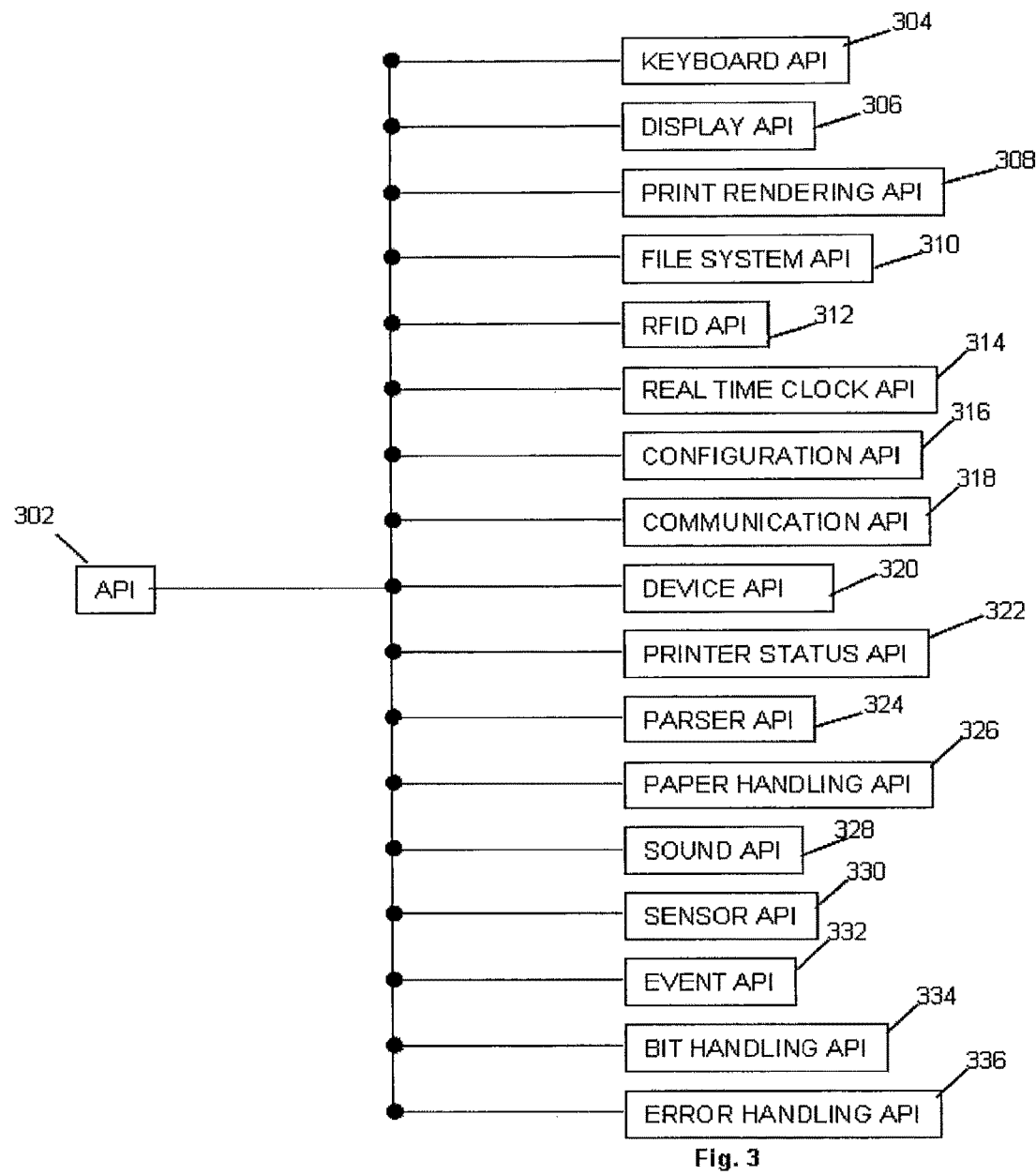
FIG. 3 is a block diagram that illustrates printer APIs provided in accordance with a preferred embodiment.

FIG. 3 is a block diagram that illustrates associated APIs 302 provided in accordance with a preferred embodiment to interface with label and tag printer 108 firmware. As shown in FIG. 3, keyboard API 304 is operable to receive and interpret (i.e., read) signals from keyboard 110 integrated with label and tag printer 108. Alternatively, keyboard API 304 operates to read and interpret signals from an external keyboard or other input device 212 not directly coupled to label and tag printer 108. Display API 306 operates to write a wide variety of textual and graphical content to display 112 integrated with printer 108. Alternatively, display API 306 operates to write textual and graphical content to an external display 214 attached to label and tag printer 108. Preferably, display API 306 supports a wide selection of fonts and coding types, for example, for many different written languages.

Continuing with reference to FIG. 3, print rendering API 308 supports user-defined data field elements to be output on a label printed by label and tag printer 108. Examples of such data field elements include textual data fields, 1-D and 2-D barcodes, lines and boxes, trigonometric functions, images, individual pixels, graphics, formatted dates, and counter values. Printer rendering API 308 enables a user to define a type of data field and a respective position for the data field to be output on a particular label/tag. Preferably, selectable options for fonts and coding types that support various languages are provided by printer rendering API 308. Fixed length or variable length data formats are preferably supported, and includable in a field definition or input from a file or communication interface via printer rendering API 308. Other features include support for selectable color output options for defining a color of one or more of the above-described field objects. Moreover, one or more printouts or feed commands are issuable as a function of print rendering API 308 that output blank or printed labels and tags. Preferably, a user-selectable print quality control feature is further provided by print rendering API 308.

Further, file system API 310 is preferably provided to enable a user to store, delete, read and write to files that are located in one or more of label and tag printer's 108 read only memory file system, random access memory file system, flash memory file system, or external memory sources, such as compact flash memory cards, secure digital memory cards, USB memory devices, or the like. Providing a user with access to data, files or the like that are stored in various internal and external sources associated with label and tag printer 108 significantly increases flexibility for users to control and manipulate label and tag printer 108 operation. Examples of various functionality preferably provided in connection with file system API 310 include formatting label and tag printer's 108 file system, determine entries in iterations of a directory, navigating to a particular directory, create a new directory, copy files, remove a directory or file, determine used and available bytes in the file system, and change access rights to a file or directory.

Continuing with reference to FIG. 3, radio frequency identification ("RFID") API 312 supports read and write access to a RFID chip/inlay provided with label and tag printer 108. Additionally, real time clock API 314 enables a user to define and read date and time data to and from label and tag printer 108. Configuration API 316 supports user-defined printer-specific parameters. For example, configuration API 316 enables a user to define communication parameters associated with print speed, quality, date and time functions, local languages, menu control or the like. Configuration API 316 is particularly useful to enable a user to define or modify operating controls for label and tag printer 108 that are typically exclusive to firmware provided with label and tag printer 108 and modifiable only by technically proficient users having specialized software and skills. Additionally, communication API 318 preferably controls communication with external I/O interface devices. A plurality of communication protocols and standards are supported, including, for example, RS232, RS485, RS422, USB, LAN, WLAN and external digital of relay interface.

Other APIs 302 shown in FIG. 3 include device API 320 that is operable to control devices in the printer, printer status API 322 that is operable to report the status of the printer at any given time, and parser API 324 that is operable to parse commands and/or files, such as XML commands and/or XML files that have been sent to label and tag printer 108. Once parsed, the XML commands can be interpreted and used to control output provided by label and tag printer 108.

In addition to device API 320, printer status API 322, and parser API 324, APIs 302 preferably include paper handling API 326 is provided to support a variety of paper functions, including for example, print feed, form feed, line feed, test feed or the like, for one or a plurality of label and tag sizes. Additionally, sound API 328 is shown that provides audio controls, such as for a beeper, buzzer or other sound device in label and tag printer 108. Moreover, sensor API 330 is shown that is operable to receive information from sensor devices, such as a label gap sensor and label mark sensor, that are provided with label and tag printer 108, and operable to determine various conditions, such as when an end of a label is reached, when an end of a ribbon is reached, and when an end of a label or ribbon is almost reached. In one embodiment, sensor API 330 operates to emit a warning when a determination of one or more of these conditions occurs. Other APIs 302 shown in FIG. 3 include event API 332 that receives and handles various events that occur in label and tag printer 108, bit handling API 334 that is operable to perform bit manipulation of data, as necessary, and error handling API 336 that is operable to handle errors that may occur with label and tag printer 108, such as a power outage, a memory error, a paper jam or the like.

Thus and in accordance with a preferred embodiment, a plurality of APIs 302 are developed, for example, in the LUA programming language or in the C programming language, and implemented in label and tag printer 108 without a need for interpreter accessing print functions via an existing control language, such as SBPL or ZPL. In addition to the APIs 302 illustrated in FIG. 3, various other miscellaneous functions are envisioned herein to be implemented in accordance with one or more embodiments. For example, functionality is supported for cloning a table and/or meta tables for rapidity and ease of development. Other examples include functionality for determining an error code value as a function of a returned error string value (e.g., "err2str( )"), functionality for saving tables in a one or more of a plurality of formats (e.g., XML, LUA or other), functionality for loading a table provided in a plurality of formats, and support for multiple written and spoken languages for menus and prompts.

Figure 4:
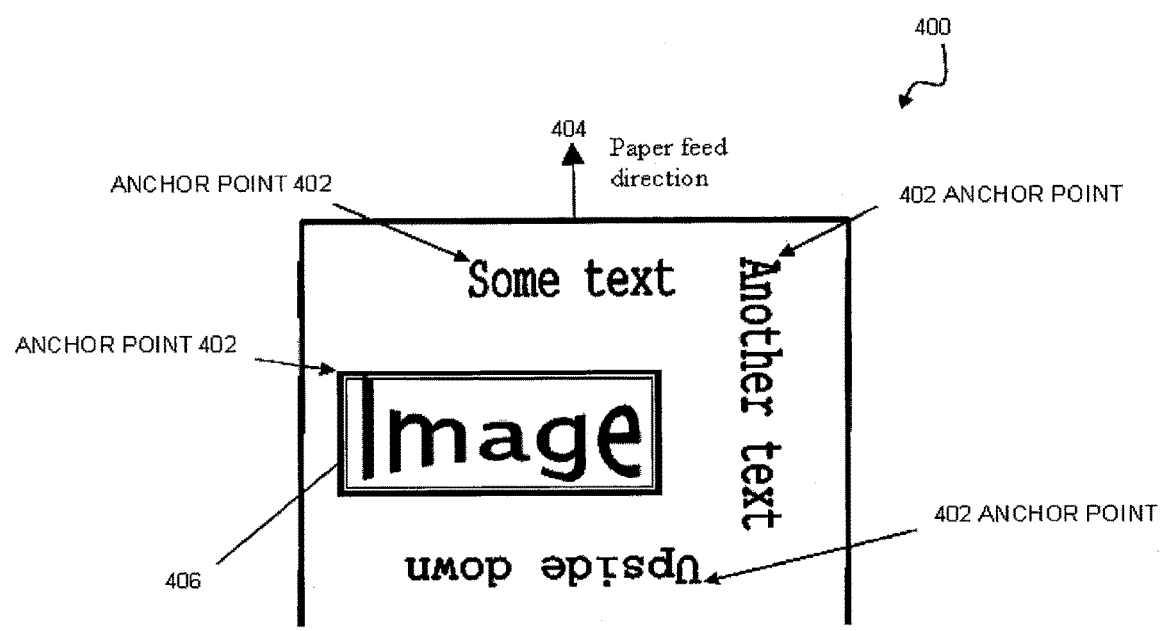
FIG. 4 illustrates an example label printed by a label and tag printer and defined using APIs provided in accordance with a preferred embodiment.

FIG. 4 illustrates an exemplary label 400 printed by label and tag printer 108, defined using APIs 302 and provided in accordance with a preferred embodiment. As shown in FIG. 4, anchor points 402 are defined in the upper leftmost (e.g., defined via hMag and vMag variable values) position of textual data printed on label 400, notwithstanding the respective orientation or position of the printed textual data. Also shown in FIG. 4 is paper feed direction 404 of label 400 as it is printed via label and tag printer 108. In addition to textual data printed on label 400, a graphical image 406 is provided, such as rendered via print rendering API 308.

Figure 5:
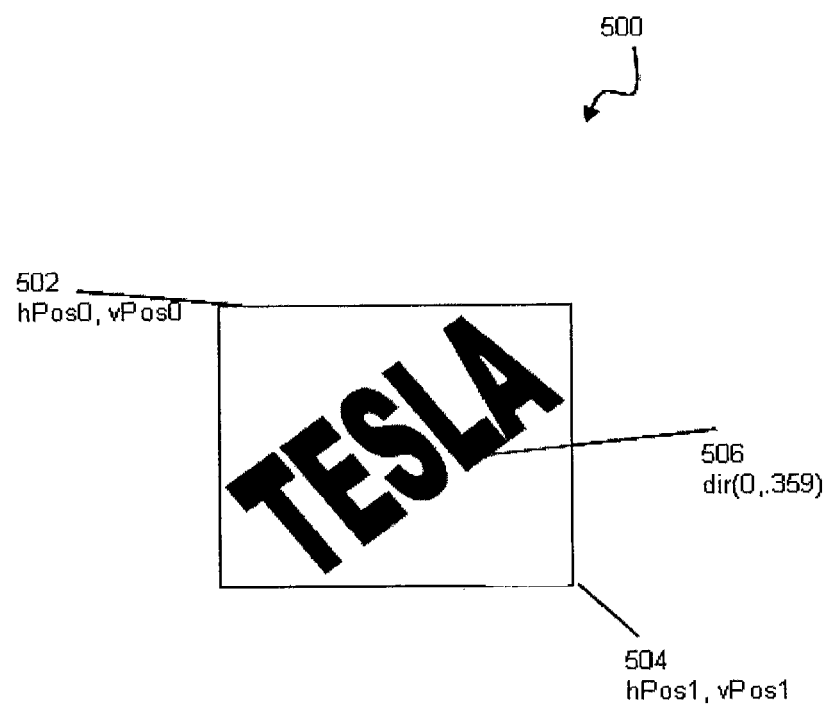
FIG. 5 illustrates an example data field size indicating respective horizontal and vertical positions and defined for data field to be provided on a label.

FIG. 5 illustrates an exemplary data field size defined for data field 500 to be provided on label 400 and indicates respective horizontal and vertical positions ("hPos" and "vPos") 502 for the upper leftmost corner of data field 500 and horizontal and vertical positions for the lower rightmost position 504. Moreover, data orientation function 506 (e.g., dir(0,.359)) indicates the relative orientation of data field 500 as it is output on label 400.

Figure 6:
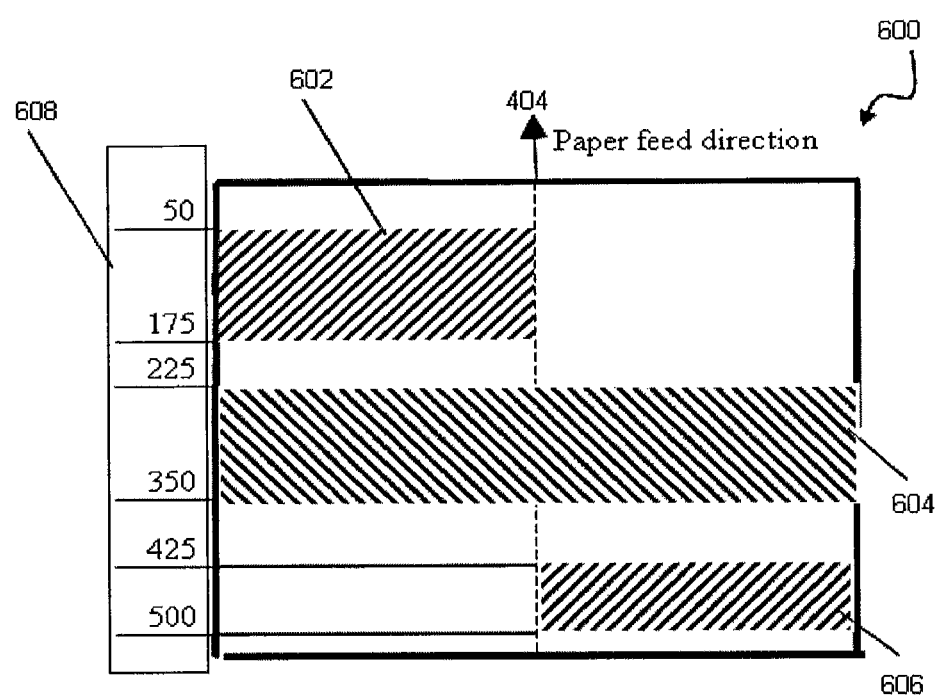
FIG. 6 illustrates another example label printed by a label and tag printer and defined using APIs and representing color options provided in accordance with a preferred embodiment.

FIG. 6 illustrates another exemplary label 600 printed by label and tag printer 108, defined using APIs 302 and provided in accordance with a preferred embodiment. In the example label 600 shown in FIG. 6, a plurality of colors 602, 604 and 606 are shown that are provided on label 600 at respective positions 608. Thus, as shown and described herein, the LUA API is an interface that operates in conjunction with a label and tag printer's 108 firmware and the LUA interpreter by implementing APIs via the LUA interpreter, and customers can create LUA application programs that implement preferred printing operations.

Figure 7:
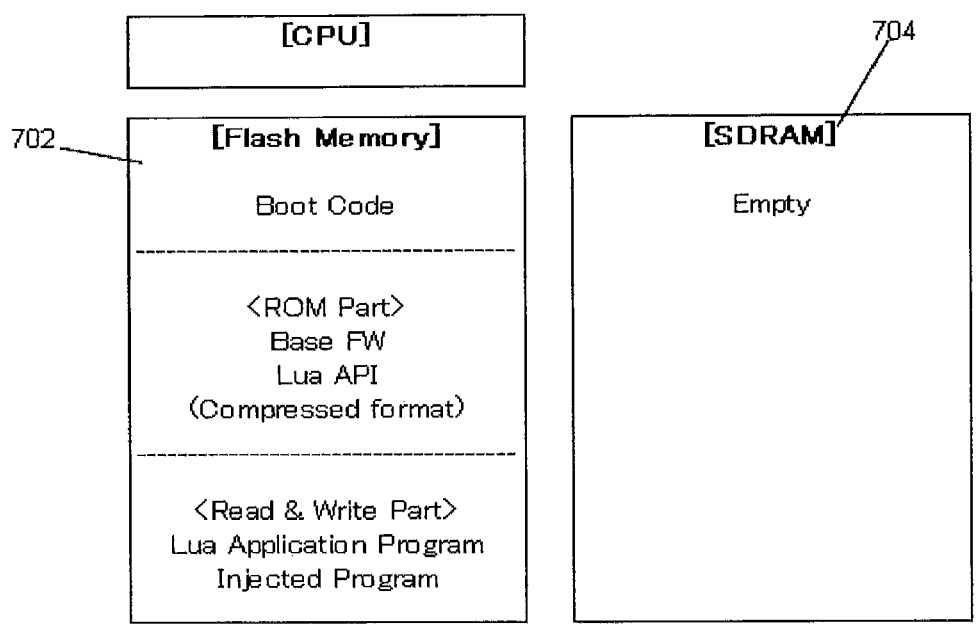
FIGS. 7-10 illustrate an implementation of a preferred embodiment that includes a plurality of electronic memory formats.

Referring now to FIG. 7, in a preferred embodiment, label and tag printer 108 is provided with two types of memory: flash memory 702 and synchronous dynamic random access memory (SDRAM) 704. Flash memory 702 (preferably used in lieu of ROM) stores, among other suitable data, label and tag printer's 108 boot code, base firmware (e.g., drivers, barcode formats or the like), the LUA API and the LUA virtual machine. As known in the art, the boot code stored in flash memory 702 operates during the printer's 108 boot-up-process. In a preferred embodiment, the label and tag printer's 108 base firmware and the LUA API are stored in flash memory 702 in a compressed format, thereby conserving memory space in flash memory 702. Moreover, customized programming, including for example a LUA application program and/or additional programming code to be deployed and injected into an existing application program, are preferably stored in flash memory 702.

Figure 8:
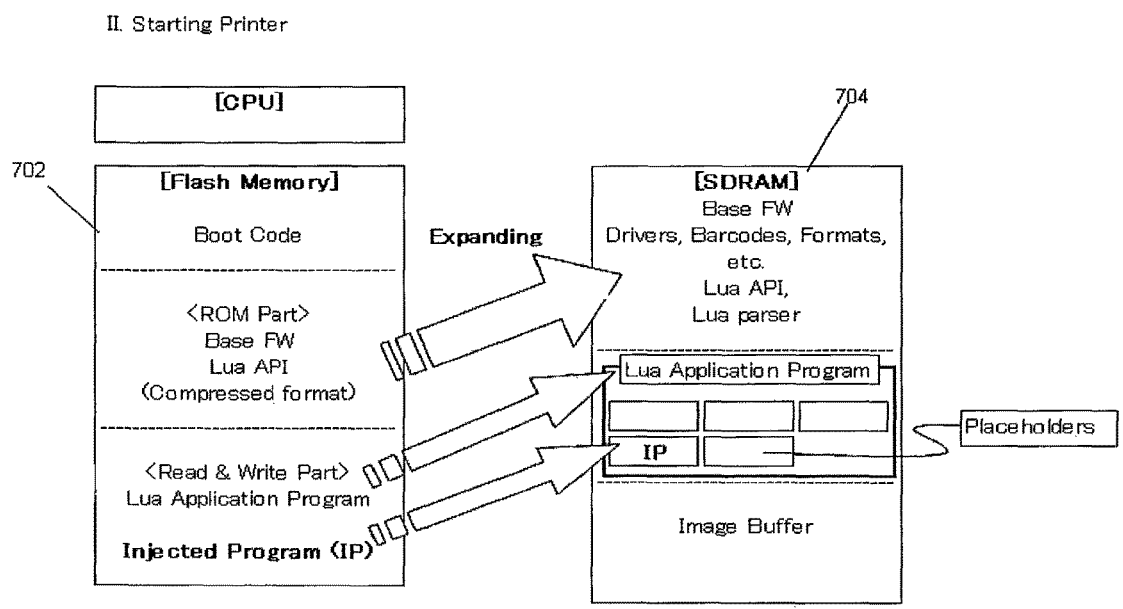

Prior to the label and tag printer 108 boot-up process, SDRAM 704 is preferably largely empty, and ready to receive data. As illustrated in FIG. 8, when label and tag printer 108 boots, label and tag printer's 108 firmware, LUA API and LUA virtual machine are preferably stored in flash memory 702 in compressed format. After the boot process, the firmware, LUA API, and LUA virtual machine are uncompressed and provided to SDRAM 704 in the uncompressed format. Thereafter, label and tag printer's 108 base firmware, drivers, bar codes data, label formats, parser, image buffer and other data, as appropriate, are temporarily stored for operation in SDRAM 704. Moreover, an application program, for example, developed in the LUA programming language is provided to SDRAM 704. As illustrated in FIG. 8, and described herein, the LUA application preferably includes placeholders for additional programming code (illustrated as "IP") to be deployed and "injected" into the application program, as appropriate.

Figure 9:
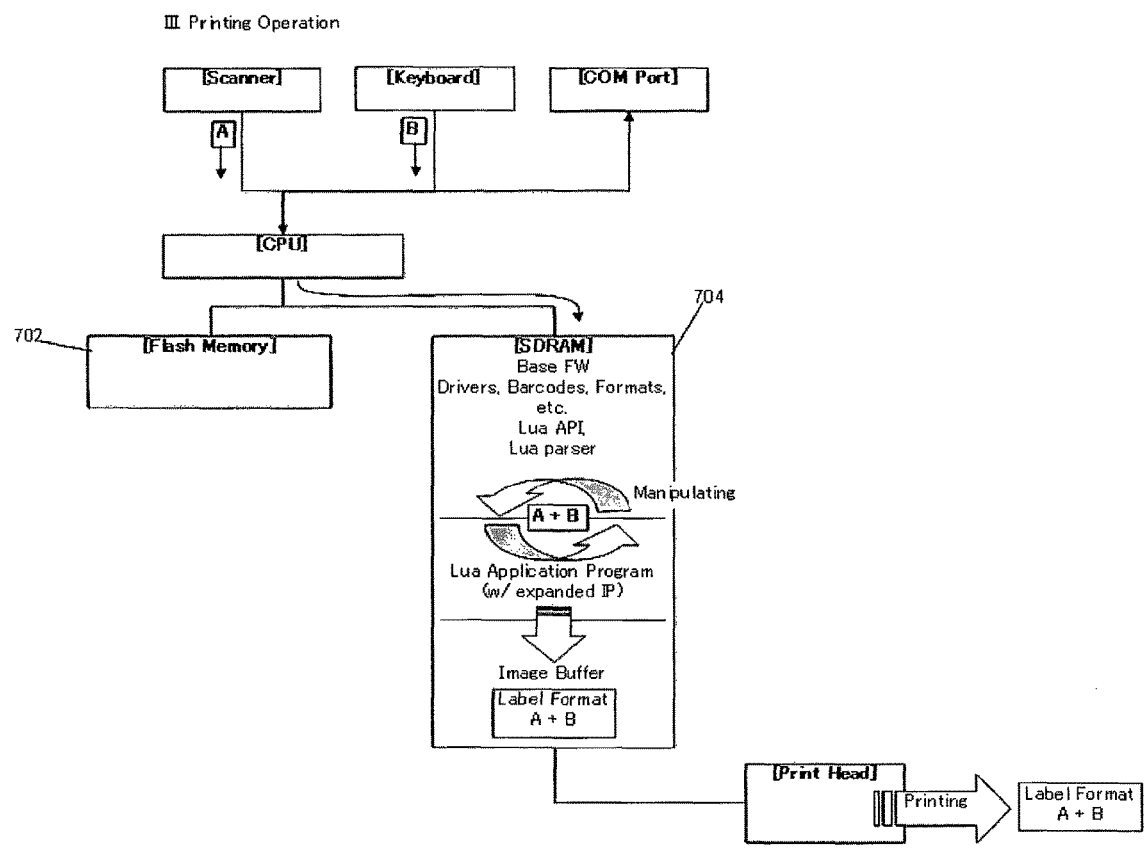

With reference to FIG. 9, the LUA virtual machine preferably operates via SDRAM 704 in connection with the printer's 108 firmware, LUA API and parser. In this way and in accordance with a preferred embodiment, label and tag printer 108 does not rely upon flash memory 702 exclusively during printing operations but, instead, operates via uncompressed data and instructions stored in SDRAM 704 for operation. This embodiment is preferable over typical prior art systems and method because SDRAM 704 operates faster and more efficiently than flash memory 702, and SDRAM 704 can purge uncompressed data and instructions after printer operations are complete.

Figure 10:
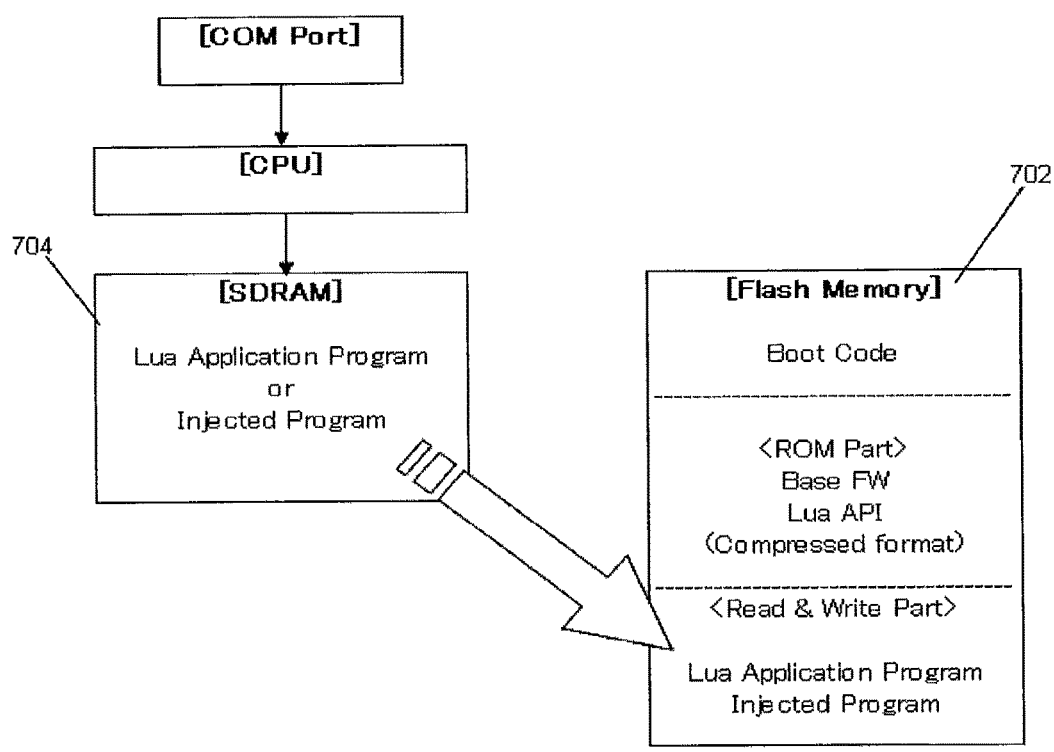

With reference to FIGS. 9 and 10, during printing operations, the LUA APIs provided in connection with the teachings herein operate via the LUA virtual machine and interface with label and tag printer 108 firmware for outputting a label image or other object that is stored in the buffer of the label and tag printer 108. Preferably, label and tag printer 108 can receive instructions (e.g., via a LUA API) and/or data from a plurality of input sources, preferably as defined via the LUA API. For example, data could be scanned, typed or otherwise provided and received via any suitable input port, including input devices 212, communication ports, network interface 208 or the like.

Thus as described and claimed herein, and shown in the accompanying drawings, functionality provided by label and tag printer 108 is preferably enhanced, modified or added as a function of APIs 302 that interface with printer's 108 firmware. The applications are preferably defined using a high level programming language, such as the LUA programming language, thereby precluding a need for individuals to be proficient in a particular printer model firmware proprietary programming language, or to have access to a proprietary development tool to modify a printer's firmware. Moreover, additional programming code to be "injected" into a currently running LUA application is operable to be received and executed in conjunction with or in addition to a LUA application. Accordingly, a printer is enabled for application development without a need to write applications using a printer's proprietary interpreted language, and programming code can be injected into a running application as a function of placeholders that are provided in the application.

Thus, in accordance with the teachings herein, new printer applications can be developed and deployed that interface with a previously executed printer application as a function of one or more placeholders. New printer functionality is provided without having to replace a whole program and restarting a printer. Thus, time and programming constraints of the prior art are overcome by enabling users to add printer functions, such as to a previously deployed LUA program. In accordance with the teachings herein, users need not modify previously deployed programs and re-deploy the programs to a printer. Instead, custom applications provided with placeholders can recognize when a new application has been provided and, via the placeholders, can inject the new application into the previously deployed application to provide for enhanced printer functionality quickly and conveniently.

Although the present invention is described and shown in relation to particular embodiments thereof, many other variations and modifications and other uses will become apparent to those skilled in the art. It is preferred, therefore, that the present invention be limited not by the specific disclosure herein.

The invention claimed is:
1. A label and tag printer comprising:
hardware;
firmware configured to control functions of the label and tag printer, the firmware including first source code to perform an initial function of the label and tag printer, the initial function being a function to print a first format of an image on a label, and second source code to perform an extended function of the label and tag printer, the extended function comprising at least a function to print a second format of an image on a label;
a first memory storing an application program, at least one application program interface configured to directly interface with the firmware, the application program including a first software command to instruct performance of the initial function and a place holder, the extended function being formatted as the at least one application program interface, wherein boot code is stored in the first memory and is executed during a boot-up process of the label and tag printer;
a processor which is configured to:
call the first source code, in accordance with the first software command;
perform the initial function, by controlling the hardware in accordance with the called first source code;
introduce a second software command to instruct performance of the extended function to the place holder;
call the second source code, in accordance with the introduced second software command;
perform the extended function, by controlling the hardware in accordance with the called second source code,
build an image buffer on the second memory after the boot-up process of the label and tag printer,
generate print data corresponding to the image, by executing the application program on a virtual machine,
render the print data to image data, corresponding to the first format and the second format, based on the first source code and the second source code, respectively,
write the image data on the image buffer,
control the hardware to print the image corresponding to the image data on the image buffer, and
purge the application program from the second memory and download the application program to the first memory after operation of the label and tag printer is concluded; and
a second memory having a higher operation speed than that of the first memory,
wherein the processor is further configured to expand and write the application program, the at least one application program interface, the virtual machine, and the firmware, which are stored in a compressed format in the first memory prior to the boot-up process of the label and tag printer, on the second memory in an uncompressed format, after the boot-up process of the label and tag printer.

2. The label and tag printer of claim 1, wherein the extended function changes a font of text included in the image, and the second source code defines variable fonts of the text.

3. The label and tag printer of claim 1, wherein the extended function changes a format of the image, and the second source code defines variable formats of the image.

4. The label and tag printer of claim 1, wherein the processor is further configured to delete the at least one application program interface, and the firmware from the second memory after printing the first format of the image or the second format of the image on the label.

5. The label and tag printer of claim 1, further comprising a keyboard, wherein
  the extended function further comprises a function to receive a signal from the keyboard and to interpret the signal, and
  the second source code defines an operation corresponding to the signal.

6. The label and tag printer of claim 1, wherein, during printing operation of the label and tag printer, the at least one application program interface interfaces with the firmware through the virtual machine to enable the processor to control the hardware to print the image corresponding to the image data on the image buffer.

7. The label and tag printer of claim 1, wherein the second source code is written into the application program, after the boot-up process of the label and tag printer, such that the second source code is located at the place holder of the application program.

* * * * *